(12) United States Patent
Kumar et al.

(10) Patent No.: US 9,160,627 B2
(45) Date of Patent: Oct. 13, 2015

(54) MULTIPLE HETEROGENEOUS NOC LAYERS

(71) Applicants: Sailesh Kumar, San Jose, CA (US);
Eric Norige, East Lansing, MI (US)

(72) Inventors: Sailesh Kumar, San Jose, CA (US);
Eric Norige, East Lansing, MI (US)

(73) Assignee: NetSpeed Systems, San Jose, CA (US)

( * ) Notice: Subject to any disclaimer, the term of this patent is extended or adjusted under 35 U.S.C. 154(b) by 281 days.

(21) Appl. No.: 13/856,835

(22) Filed: Apr. 4, 2013

(65) Prior Publication Data

US 2014/0301241 A1    Oct. 9, 2014

(51) Int. Cl.
*H04L 12/28* (2006.01)
*H04L 12/24* (2006.01)
*H04L 12/933* (2013.01)

(52) U.S. Cl.
CPC .............. *H04L 41/12* (2013.01); *H04L 49/109* (2013.01); *H04L 49/10* (2013.01)

(58) Field of Classification Search
None
See application file for complete search history.

(56) References Cited

U.S. PATENT DOCUMENTS

| | | | |
|---|---|---|---|
| 5,432,785 A | 7/1995 | Ahmed et al. | |
| 5,764,740 A | 6/1998 | Holender | |
| 5,991,308 A | 11/1999 | Fuhrmann et al. | |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 7,065,730 B2 | 6/2006 | Alpert et al. | |
| 7,318,214 B1 | 1/2008 | Prasad et al. | |
| 7,590,959 B2 | 9/2009 | Tanaka | |
| 7,725,859 B1 | 5/2010 | Lenahan et al. | |
| 7,808,968 B1 | 10/2010 | Kalmanek, Jr. et al. | |
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedl et al. | |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Andrew Lai
*Assistant Examiner* — Jamaal Henson
(74) *Attorney, Agent, or Firm* — Procopio, Cory, Hargreaves & Savitch LLP

(57) ABSTRACT

Systems and methods described herein are directed to solutions for Network on Chip (NoC) interconnects that automatically and dynamically determines the topology of different NoC layers and maps system traffic flows to various routes in various NoC layers that satisfies the latency requirements of the flows. The number of layers and their topology is dynamically allocated and optimized by performing load balancing of the traffic flows between the channels and routes of different NoC layers and updating the topology of the NoC layers as they are mapped. In addition to allocating additional NoC layers and topologies to satisfy the latency requirements of the flows, the NoC layers and topologies may also be allocated to satisfy the bandwidth requirements of the flows or to provide the additional virtual channels that may be needed for deadlock avoidance and to maintain the isolation properties between various flows.

15 Claims, 16 Drawing Sheets

(56) References Cited

U.S. PATENT DOCUMENTS

| | | |
|---|---|---|
| 8,136,071 B2 | 3/2012 | Solomon |
| 8,281,297 B2 | 10/2012 | Dasu et al. |
| 8,312,402 B1 | 11/2012 | Okhmatovski et al. |
| 8,448,102 B2 | 5/2013 | Kornachuk et al. |
| 8,492,886 B2 | 7/2013 | Or-Bach et al. |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,635,577 B2 | 1/2014 | Kazda et al. |
| 8,667,439 B1 | 3/2014 | Kumar et al. |
| 8,717,875 B2 | 5/2014 | Bejerano et al. |
| 2002/0071392 A1 | 6/2002 | Grover et al. |
| 2002/0073380 A1 | 6/2002 | Cooke et al. |
| 2002/0095430 A1 | 7/2002 | Egilsson et al. |
| 2004/0216072 A1 | 10/2004 | Alpert et al. |
| 2005/0147081 A1 | 7/2005 | Acharya et al. |
| 2006/0161875 A1 | 7/2006 | Rhee |
| 2007/0118320 A1 | 5/2007 | Luo et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2008/0072182 A1 | 3/2008 | He et al. |
| 2008/0120129 A1 | 5/2008 | Seubert et al. |
| 2009/0070726 A1 | 3/2009 | Mehrotra et al. |
| 2009/0268677 A1 | 10/2009 | Chou et al. |
| 2009/0313592 A1 | 12/2009 | Murali et al. |
| 2010/0040162 A1 | 2/2010 | Suehiro |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0119322 A1* | 5/2011 | Li et al. .................. 709/201 |
| 2011/0154282 A1 | 6/2011 | Chang et al. |
| 2011/0191774 A1* | 8/2011 | Hsu et al. .................. 718/100 |
| 2011/0276937 A1 | 11/2011 | Waller |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0110541 A1 | 5/2012 | Ge et al. |
| 2012/0155250 A1 | 6/2012 | Carney et al. |
| 2012/0201171 A1* | 8/2012 | Ramanujam et al. ......... 370/258 |
| 2013/0051397 A1 | 2/2013 | Guo et al. |
| 2013/0080073 A1 | 3/2013 | De Corral |
| 2013/0103369 A1 | 4/2013 | Huynh et al. |
| 2013/0151215 A1 | 6/2013 | Mustapha |
| 2013/0159944 A1 | 6/2013 | Uno et al. |
| 2013/0174113 A1 | 7/2013 | Lecler et al. |
| 2013/0207801 A1 | 8/2013 | Barnes |
| 2013/0219148 A1 | 8/2013 | Chen et al. |
| 2013/0263068 A1 | 10/2013 | Cho et al. |
| 2013/0326458 A1 | 12/2013 | Kazda et al. |
| 2014/0068132 A1 | 3/2014 | Philip et al. |
| 2014/0092740 A1 | 4/2014 | Wang et al. |
| 2014/0098683 A1 | 4/2014 | Kumar et al. |
| 2014/0115218 A1 | 4/2014 | Philip et al. |
| 2014/0115298 A1 | 4/2014 | Philip et al. |

OTHER PUBLICATIONS

Das, R., et al., Aergia: Exploiting Packet Latency Slack in On-Chip Networks, 37th International Symposium on Computer Archictecture (ISCA '10), Jun. 19-23, 2010, 11 pgs.

Ebrahimi, E., et al., Fairness via Source Throttling: A Configurable and High-Performance Fairness Substrate for Mutli-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA Memo 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

\* cited by examiner

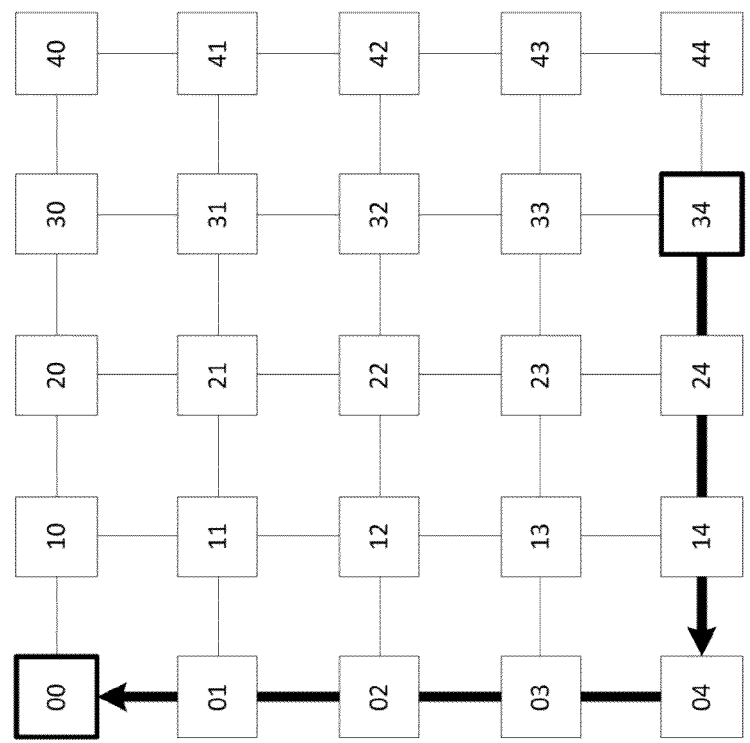

MULTIPLE HETEROGENEOUS NOC LAYERS

BACKGROUND

1. Technical Field

Methods and example implementations described herein are directed to interconnect architecture, and more specifically, to automatically designing one or more Network on Chip (NoC) layers of the same or different topologies in a NoC system interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

SUMMARY

Aspects of the present application include a method, which may involve automatically and dynamically designing multiple heterogeneous network on chip (NoC) interconnect layers; each NoC layer may have a different topology and connectivity between various system components; determining the topology of each layer based on the latency and priority of various traffic flows; assigning traffic flows and messages to different NoC layers based on the latency and bandwidth requirements of various traffic flows; and automatically configuring each NoC layer hardware elements and topology based on the traffic flow assignments. Multiple NoC layers may also be allocated for additional bandwidth or virtual channels needed by the system traffic flows. Load balancing may be performed over different routes in each NoC layer during mapping of flows to the NoC.

Aspects of the present application include a computer readable storage medium storing instructions for executing a process. The process may involve automatically and dynamically designing multiple heterogeneous network on chip (NoC) interconnect layers; each NoC layer may have a different topology and connectivity between various system components; determining the topology of each layer based on the latency and priority of various traffic flows; assigning traffic flows and messages to different NoC layers based on the latency and bandwidth requirements of various traffic flows; and automatically configuring each NoC layer hardware elements and topology based on the traffic flow assignments. Multiple NoC layers may also be allocated for additional bandwidth or virtual channels needed by the system traffic flows. Load balancing may be performed over different routes in each NoC layer during mapping of flows to the NoC.

Aspects of the present application include a system, which may involve automatically and dynamically designing multiple heterogeneous network on chip (NoC) interconnect layers; each NoC layer may have a different topology and connectivity between various system components; determining the topology of each layer based on the latency and priority of various traffic flows; assigning traffic flows and messages to different NoC layers based on the latency and bandwidth requirements of various traffic flows; and automatically configuring each NoC layer hardware elements and topology based on the traffic flow assignments. Multiple NoC layers may also be allocated for additional bandwidth or virtual channels needed by the system traffic flows. Load balancing may be performed over different routes in each NoC layer during mapping of flows to the NoC.

BRIEF DESCRIPTION OF THE DRAWINGS

FIG. 2(a) illustrates an example of XY routing in a related art two dimensional mesh.

DETAILED DESCRIPTION

Figure 1A:
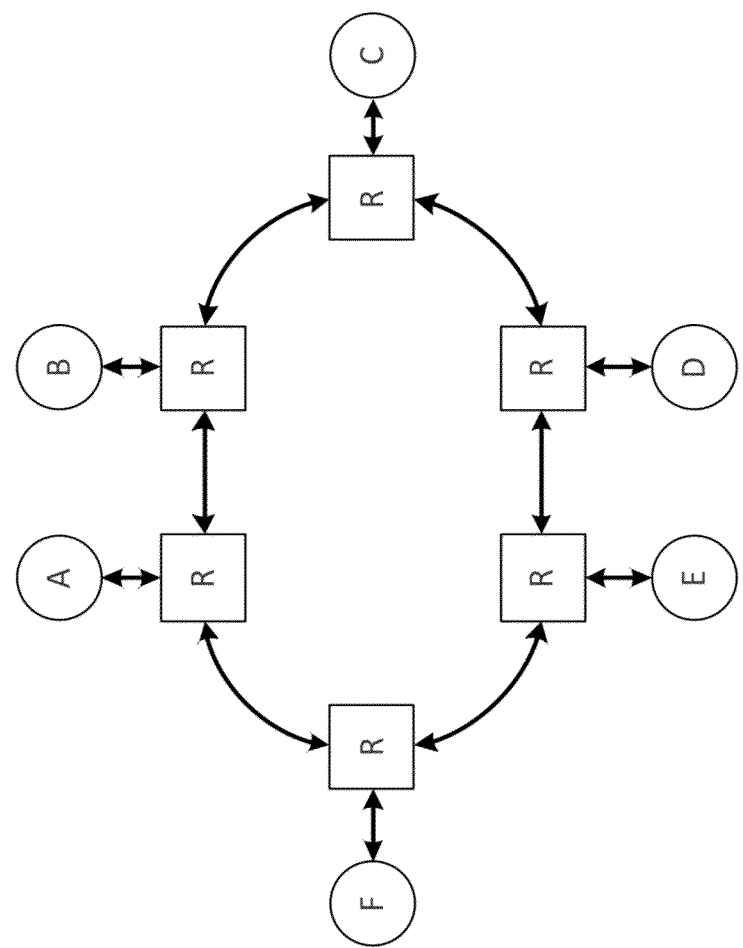
FIGS. 1(a), 1(b) 1(c) and 1(d) illustrate examples of Bidirectional ring, 2D Mesh, 2D Torus, and 3D Mesh NoC Topologies.
Figure 1B:
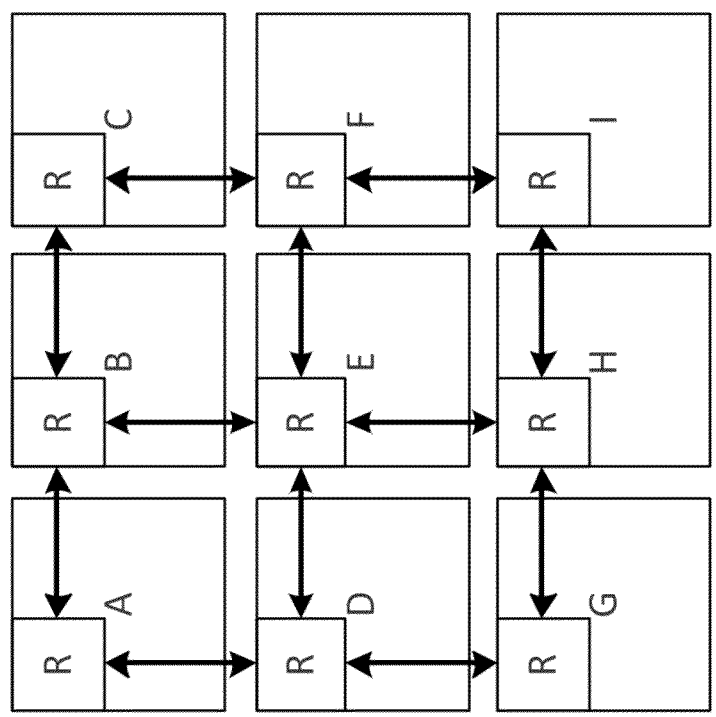
Figure 1C:
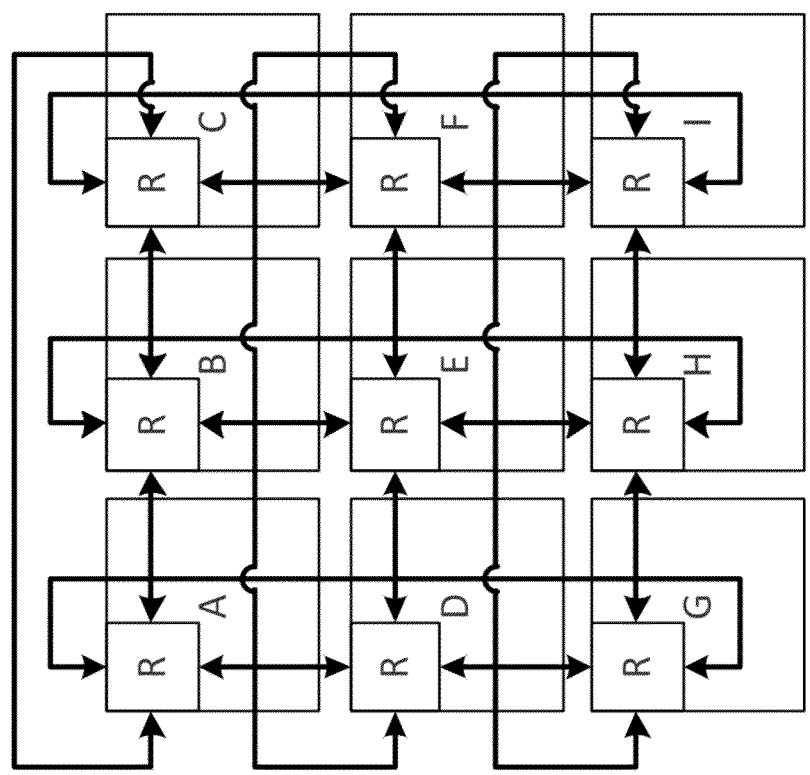
Figure 1D:
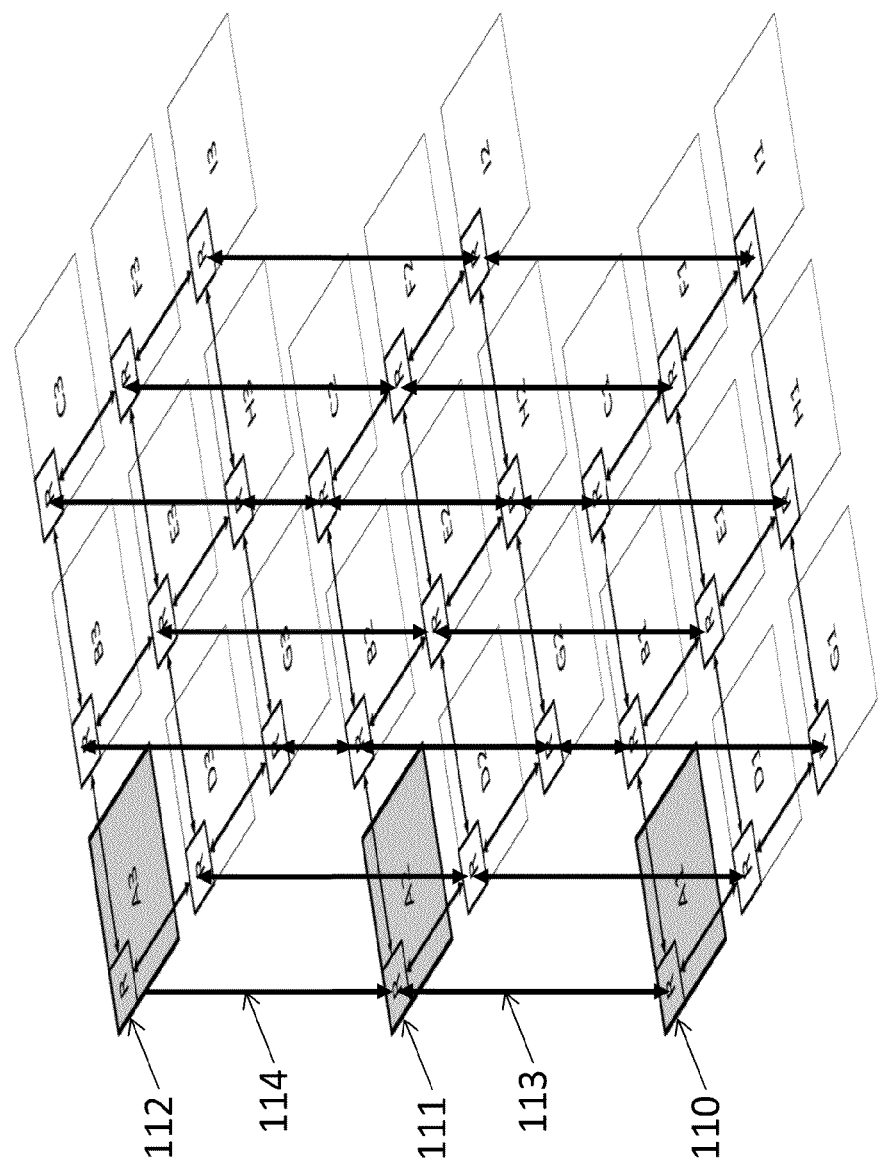
Figure 2B:
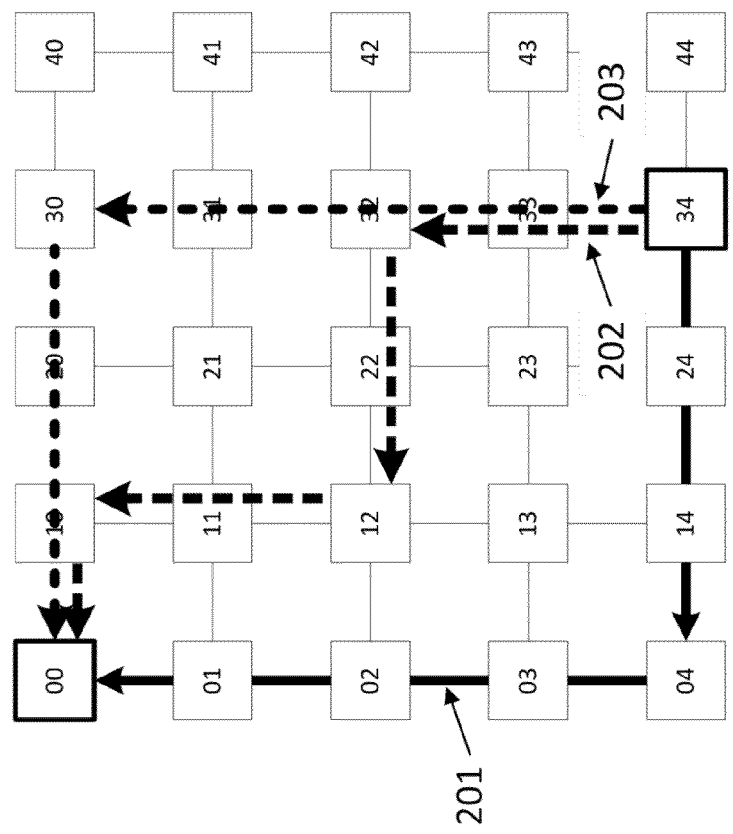
FIG. 2(b) illustrates three different routes between a source and destination nodes.
Figure 3A:
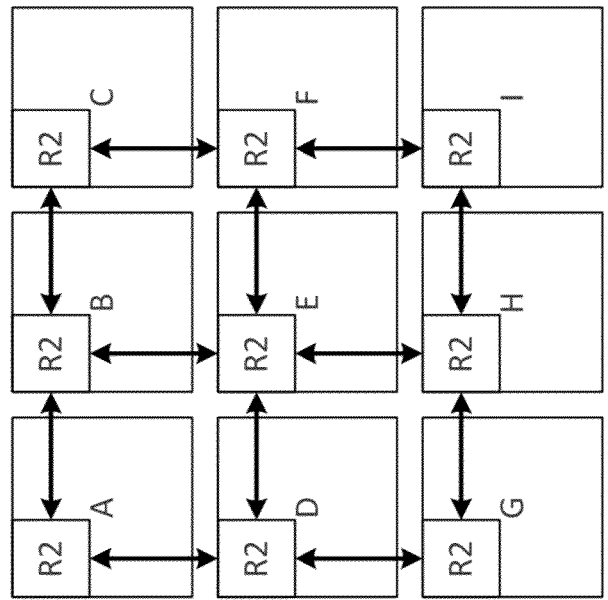
FIG. 3(a) illustrates an example of a related art two layer NoC interconnect.
Figure 3A:
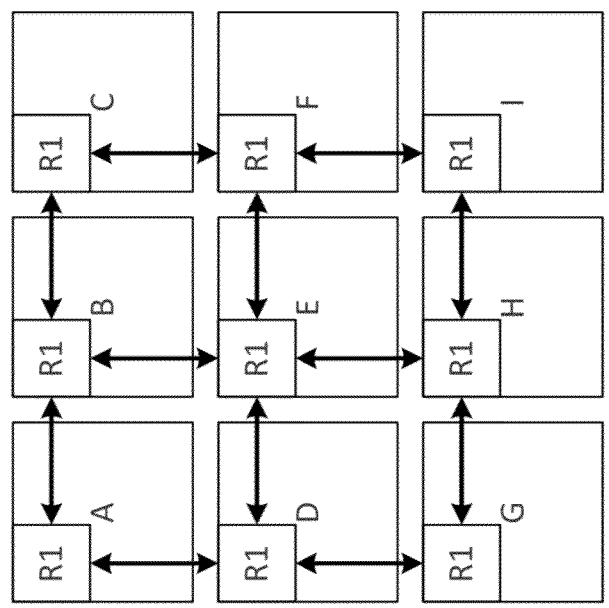
Figure 3B:
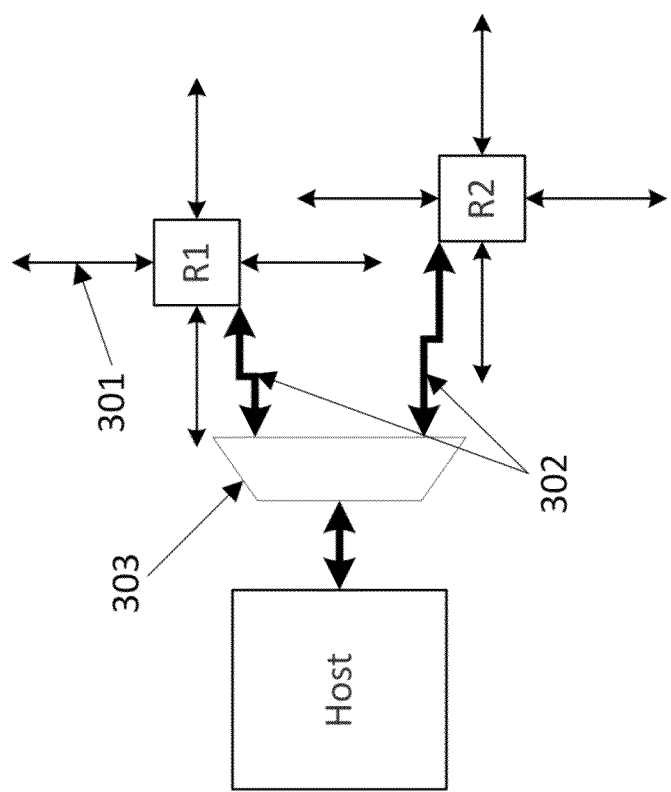
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in an NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right design point for a given system remains challenging and remains a time consuming manual process, and often the resulting designs remain sub-optimal and inefficient.

In a distributed NoC interconnect connecting various components in a system on chip with each other using multiple routers and point to point links between the routers, congestion may occur if there is excessive traffic on a link. To address congestion, additional NoC layers may be used and links may be resized. With additional NoC layers, traffic may be load balanced between different layers. Multiple NoC layers may also be used to provide the additional virtual channels needed to map the system traffic to the NoC channels. When multiple layers are allocated, different layers may have different topology and provide different connectivity between various components. Different topologies may provide different latency characteristics and number of hops between various components providing routes between components that have different latencies. Thus, traffic flows may be mapped to the topologies based on their latency requirements. Alternatively based on the latency requirements of the traffic flows, different NoC topologies may be automatically constructed with the number of hops between components in at least one NoC topology that satisfies the latency requirements of the flows between the components. The example implementations illustrate the concept of automatically constructing one or more NoC layers with similar or different topologies and mapping the system traffic flows to the NoC so that the latency requirements of the flows are satisfied in at least one NoC layer.

Figure 4A:
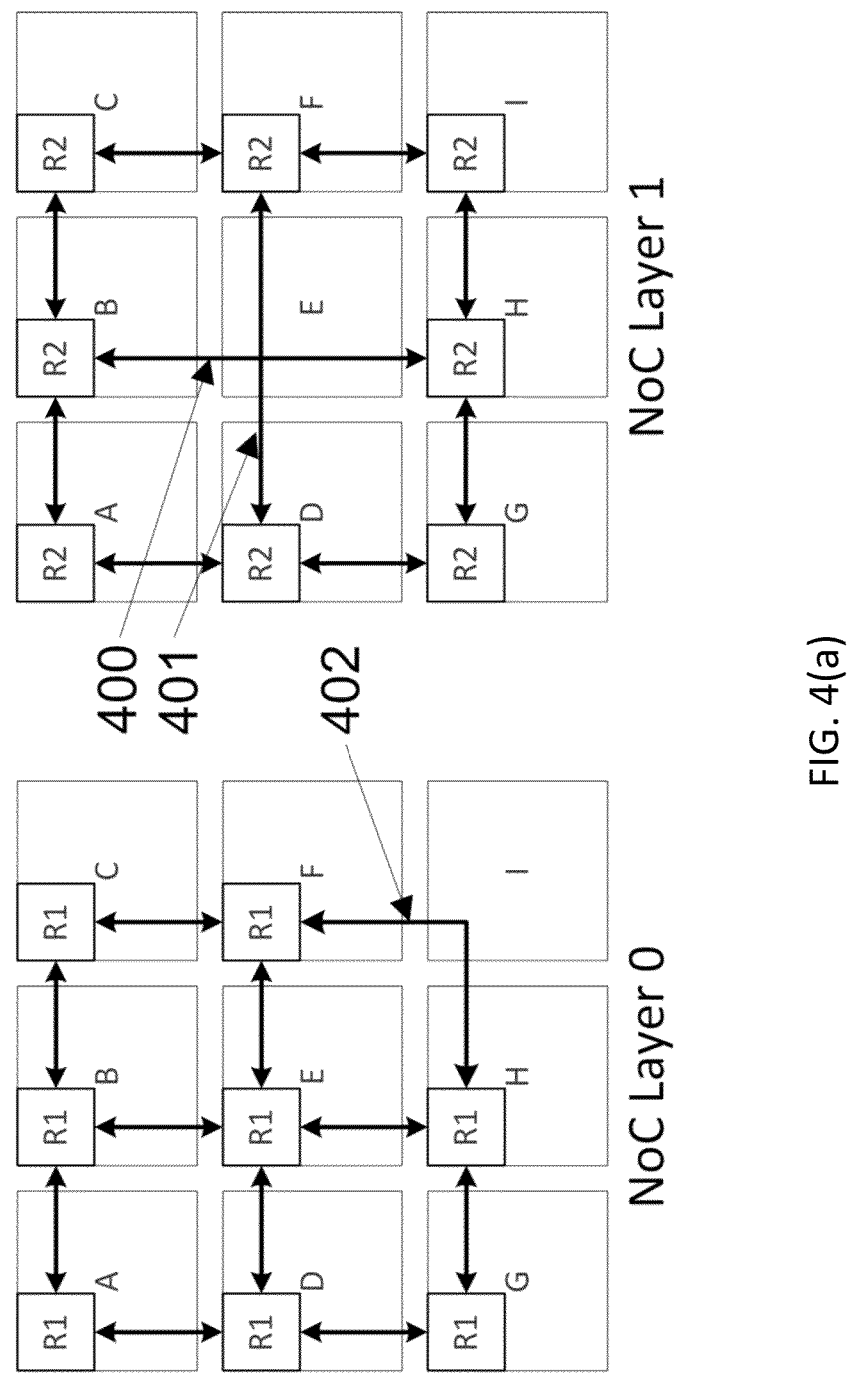
FIG. 4(a) illustrates an example of two NoC layers that have different topology, in accordance with an example implementation.

FIG. 4(a) illustrates a multi-layer NoC, where each layer has different topology and connectivity, in accordance with an example implementation. Here there are two NoC layers. Each layer is derived from a 3×3 mesh topology connecting nine components with each other. Layer 0 on the left only has eight routers instantiated and connected to each other using point to point links as shown. There is no router at position I in layer 0, so component I is connected only at NoC layer 1 and not connected to any router in layer 1. Layer 1 on the right also has eight routers as shown. There is no router at the position of component E, consequently component E is connected only at NoC layer 0 and not connected to any router in layer 1. Some links in layer 0 and layer 1 are also longer; link 400 directly connects router at component B's position to router at component H's position, and link 401 directly connects router at component D's position to router at component F's position. Link 402 in layer 0 also has longer wire directly connecting component H and F in layer 0. NoC layer 1 has a different topology than NoC layer 0, and the latency in number of hops of layer 0 and layer 1 are different between certain components (e.g. between A and H along route A-B-H and between G and F along route G-D-F and between H and F along route H-I-F). When multiple NoC topologies with different latency characteristic are available, it may be beneficial to map higher priority traffic flows or the flows with tight and low latency constraints to the layer with route with lower number of hops.

Figure 4B:
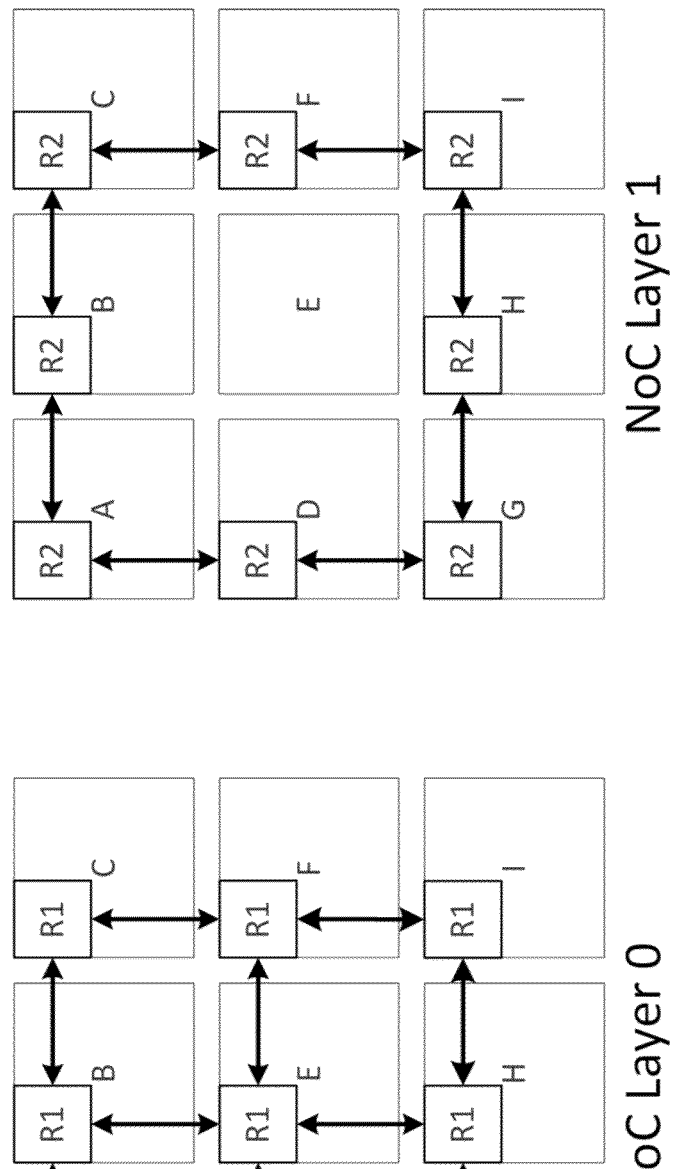
FIG. 4(b) illustrates another example of two NoC layers that have different topology, in accordance with an example implementation.

FIG. 4(b) illustrates a multi-layer NoC, the first layer is a full 2D mesh topology, while the second layer is a ring topology. The first layer (NoC Layer 0) provides connectivity to all nine hosts as each are connected to one the NoC router. The second layer (NoC Layer 1) is a ring of eight routers as shown and it provides connectivity to only eight hosts, (i.e. all but the host E). In example implementations, heterogeneous NoC layers allow multiple NoC layers to be different in topology from each other, as well as to provide different connectivity between various hosts in the system, whereas the related art has been solely directed to homogenous NoC layers. Additionally, the example implementations illustrate automatic construction of multiple NoC layers and their topologies to meet the system performance requirements such as latency. Such heterogeneous NoC layers can be useful if there are system requirements that cannot be satisfied in one topology, e.g. high bandwidth traffic may need a topology with high bisection bandwidth and large number of routers and links while low latency traffic between certain hosts may require fewer router hops in the NoC between the two hosts. The example implementations provide automatic identification of such traffic requirements and subsequently automatic construction of multiple NoC layers with different topologies and mapping of traffic to them so that that the different system traffic requirements can be met.

Example implementations are directed to designing multiple NoC layers with different topologies so that messages with lower latency requirements traverse in a layer with a topology that has fewer hops between the flow's end points. The NoC layers and topologies may be automatically determined as flows are being mapped to satisfy the flows latency requirements. An example implementation of automatic NoC topology construction may divide the system traffic flows into classes based on the latency requirements of the flows. In example implementations, the traffic class of a flow may be decided based on the normalized latency requirement of the flows. The normalization of latency requirement may be done with the physical distance of the two end-points of the flow so that the relative latency of various flows can be compared with each other. For example a flow whose end points are two hops away in the 2D grid and whose latency requirement is also two hops may belong to the same class as a flow whose end points are four hops away in the 2D grid and whose latency requirement is also four hops even if the absolute latency requirements of the flows are different. Thus the latency requirements of the flow and the physical distance between the source and destination component of the flow in the grid are used to determine the traffic class. The normalized latency may be computed using the following formula:

> Normalized latency=latency in number of hops/number of grid hops between the source and destination of the flow Subsequently multiple traffic classes can be defined based on different normalized latency requirements present in the traffic. If normalized latency of a flow is greater than one, then a Manhattan path route in both a standard full mesh topology as well as any other topology derived from the mesh (e.g, by omitting certain routers and links, by using longer links between certain routers, etc.) may be adequate for the flow's latency requirement. An example design may still classify such flows in multiple classes, and map flows of classes with different normalized latency values into different topologies. Flows with smaller than one normalized latency value will need more attention. These flows may need to be mapped to a topology that has fewer hops between the flow's end points than a standard full mesh topology, thereby having a different topology in which there are fewer routers than the one in full mesh between the source and destination nodes of the flow. In this topology the links between certain routers will also be longer than the ones in a standard full mesh topology.

Example implementations described herein are directed to solutions for 2-D, 2.5-D and 3-D NoC mesh and Torus interconnects for automatically constructing multiple NoC layers with heterogeneous topologies and mapping traffic to the layers to meet the system traffic latency requirements. Bandwidth and virtual channel requirements for the flows may also be used in addition to the latency requirements of the flows to determine the NoC topologies. An example implementation described next maps flows in decreasing order of normalized latency, mapping flows with higher latency values first. The process starts with an empty NoC with no routers instantiated in any layer. When a flow is mapped, a router at the source and a router at the destination nodes in a NoC layer need to be instantiated, and a route in the layer needs to be picked for the flow. All NoC layers starting from layer 0 are examined; both XY and YX routes are considered (one may consider additional staircase routes as well) in the layer and it is determined whether they are eligible for mapping this flow. For a route to be eligible the number of already existing router hops along the route in the layer and the number of new routers that must be instantiated when this flow will be mapped must be smaller than the latency requirement of the flow. Additionally, example implementations provide that after adding this flow in this layer, the existing flows previously mapped to the NoC layer latency requirement remain satisfied. If router hops are instantiated at the source and destination nodes of the flow (in case if it did not exist already) then all flows that are traversing through these nodes will have their latency increased by one additional hop. In this case, example implementations provide that these affected flows latency constraint remain satisfied. When this flow is mapped along the route, additional intermediate routers may also be instantiated along the route if this flow merges with some previously mapped flow at some point in the route, and if a router did not exist there already. For routers to be allocated at an intermediate node along the route, the new flow and some previously mapped flow must merge at the node so that either they are arriving at the node from two different directions or they are leaving the node to two different directions, or both. In case a router needs to be instantiated at an intermediate node, a determination is made as to whether all affected flow's latency requirements remain satisfied after router is allocated at the node and the latency of the flow's traversing through the router is increased by one hop; if not the route is not eligible. If no eligible routes exist in the NoC layer, then the next NoC layer is selected and routes in the layer are examined for eligibility. If there are no additional NoC layers, then a new NoC layer may be allocated.

Figure 5A:
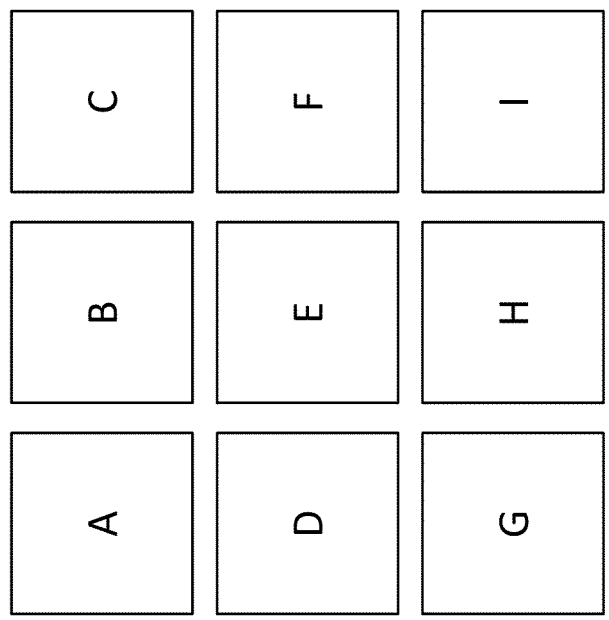
FIG. 5(a) illustrates nine system components placed in a 2D grid and six system flows and their latency requirements, to be mapped to a NoC interconnect, in accordance with an example implementation.
Figure 5B:
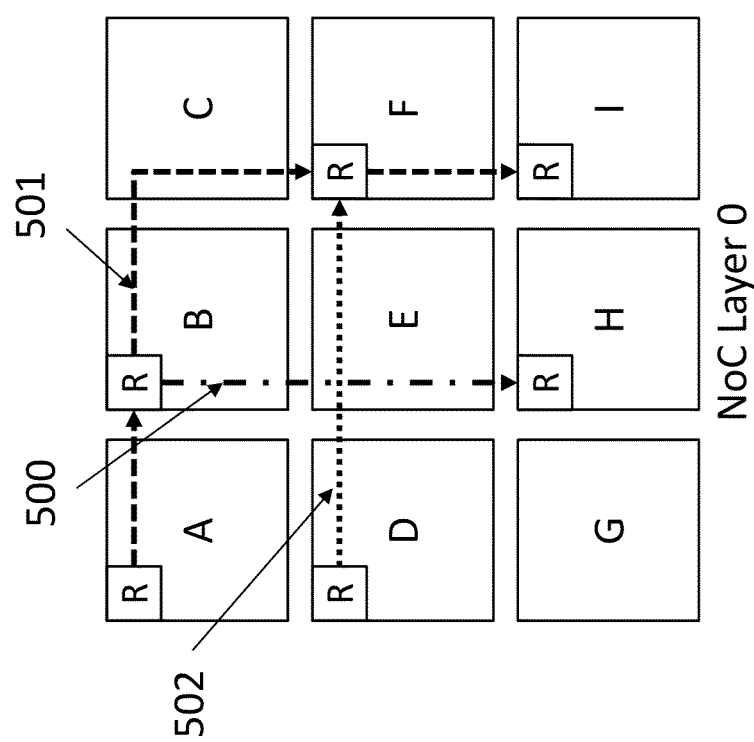
FIG. 5(b) illustrates the routers, links and routes used in NoC layer 0 for mapping the first three flows, in accordance with an example implementation.

Once one or multiple eligible routes are found in a NoC layer, among all eligible routes, the route along with which the number of router hops that are already instantiated in the NoC layer is the highest is picked; alternative implementations may pick a route based on another metrics such as lower load, lowest number of routers etc. Subsequently flow is mapped along this route and routers at the source and destination nodes of the flow as well as at the intermediate nodes positions where this flow merges with previously mapped flows in the way described earlier are instantiated if they do not exist already. This process is explained and illustrated now with an example. Consider mapping the flows of an example system and traffic profile shown in FIG. 5(a) and determining the NoC layers and topologies to satisfy the flows latency requirements. There are seven flows and their latency requirements in number of hops and the resulting normalized latency values are shown in the figure. Flows with larger normalized latency values are mapped first in this example design; thus flows B-H, A-I and D-F are mapped first. In FIG. 5(b), the resulting mapping is shown. Flow B-H takes route 500 and routers are source and destination nodes B and H are instantiated; the current latency of this flow is one hop as if there is a straight wire from B to H. In certain high frequency implementations the wire may be pipelined which will increase latency which must be accounted for as well.

Next flow A-I is mapped. XY route has one router hop (in addition to source and destination router hops) as there is already a router instantiated at node B. Route YX has no intermediate hops. Since both routes are eligible the XY route 501 is picked and routers at the end points A and I are instantiated. Next flow DF is mapped along the route 502. Routers are instantiated at nodes D and F. Instantiating router at node F increases the latency of previously mapped flow A-I by one hop, however flow A-I still meets the latency requirements (thus this route is eligible). Notice that when a flow with normalized latency greater than one is mapped, there is no need to check the latency values for eligibility as all routes will be eligible in all cases.

Figure 5C:
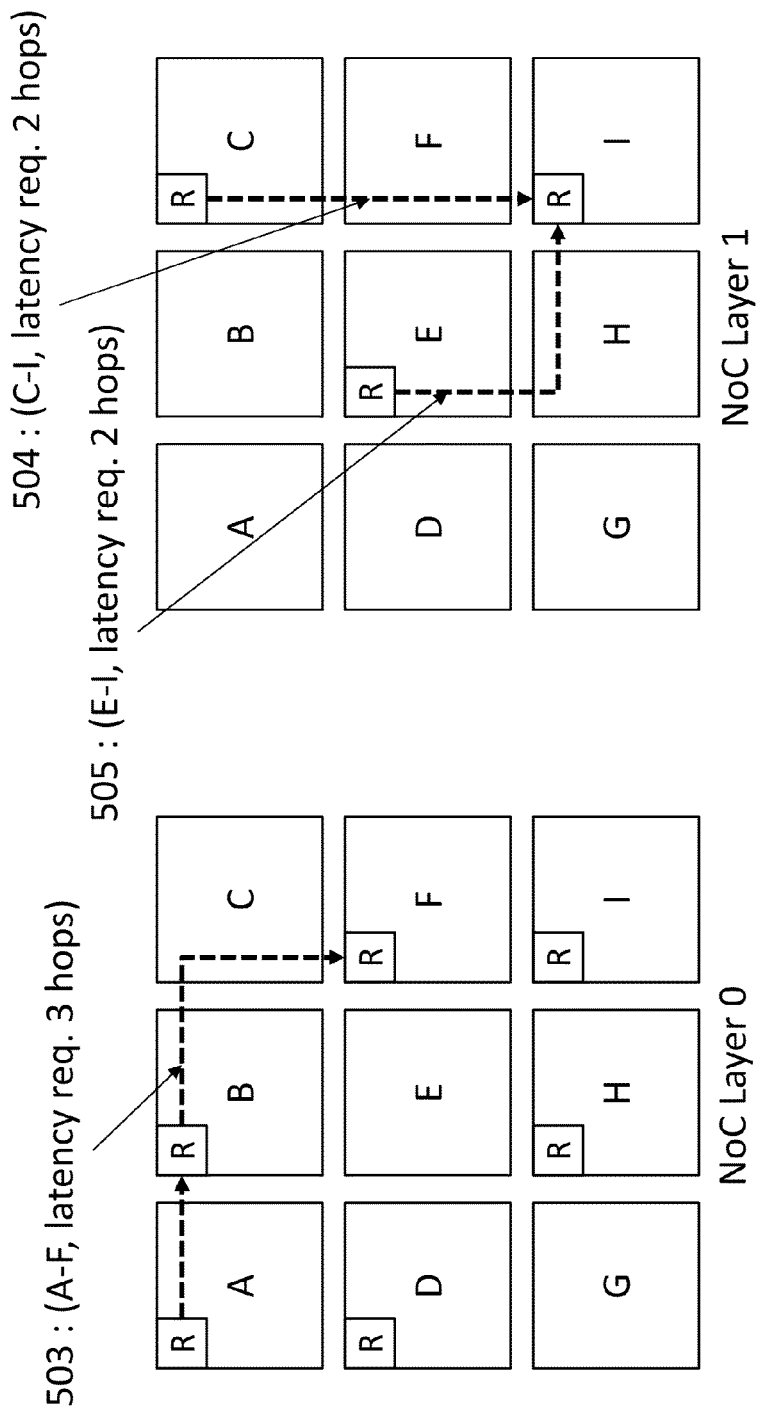
FIG. 5(c) illustrates the routers, links and routes used in NoC layer 0 for mapping the next three flows.

Next flows with normalized latency smaller than one are mapped in order of A-F, C-I and E-I; the resulting mapping is shown in FIG. 5(c). Flow A-F has XY and YZ route choices in layer 0, both are eligible as XY route has three hops and YX route has two hops. Route XY 503 is chosen and flow is mapped there. No additional routers are instantiated as this flow does not merge with another previously mapped flow at any node positions and the routers at source and destination already exists in this NoC layer. Next flow C-I is mapped, wherein there is only one shortest path route available. In layer 0, the latency of the route is two hops which does not meet the flows requirements. Therefore the route is mapped to the second NoC layer, along the route 504 wherein routers are instantiated at the source and destination hops in the layer. Next flow E-I is mapped. In NoC layer 0 both XY route and YX route have latency of three hops, which does not meet the latency requirement of two hops of this flow. Subsequently XY and YX routes in NoC layer 1 are examined for this flow. If the route is mapped along XY route (E-F-I) a router needs to be instantiated at node F as this flow will merge with the previously mapped flow C-I in this layer and the incoming direction of current flow at node F is west which is different from the incoming direction of the flow C-I at node F which is north. When router at node F is instantiated it will increase the latency of the previously mapped flow C-I and its latency requirements will not remain satisfied. Additionally, the latency requirement of this flow E-I will also not be satisfied, therefore this route is ineligible. Route YX is eligible with two hops latency, so this flow is mapped along this route 505.

Figure 5D:
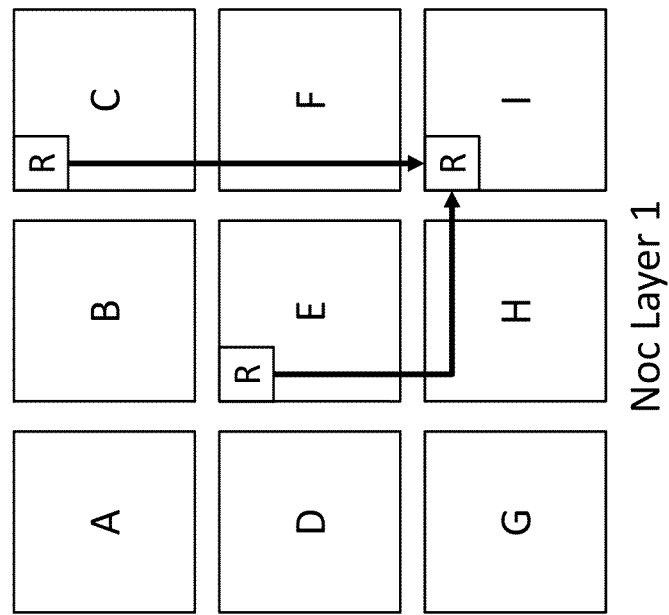
FIG. 5(d) illustrates the resulting NoC layer 0 and NoC layer 1 after mapping all 6 flows. The two NoC have different topologies.
Figure 5D:
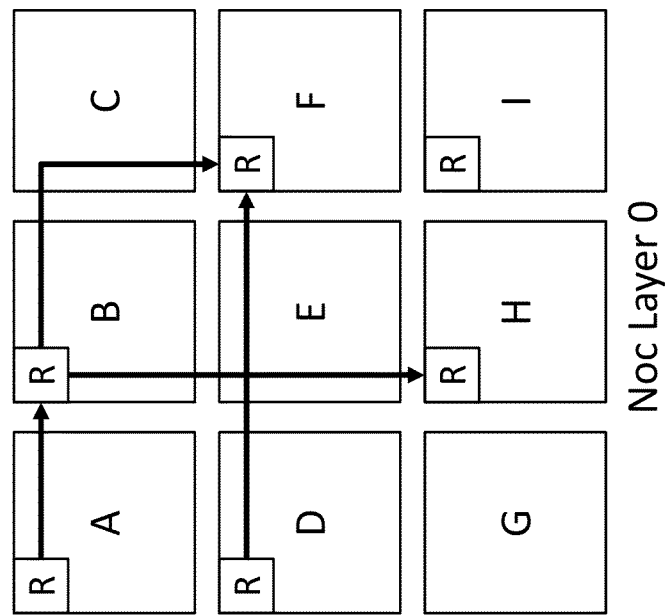

The final resulting two NoC layers with the routers and links between the routers in each layer are shown in FIG. 5(d).

To determine eligibility of routes in various NoC layers as flows are mapped to them, an example implementation may need to track all flows that are currently mapped to the NoC layers and routes, and the requirements of the flows such as latency in number of hops, etc. When new flows are mapped at a NoC layer and route, the flow information must be updated so that the subsequent flows are mapped correctly.

Figure 6:
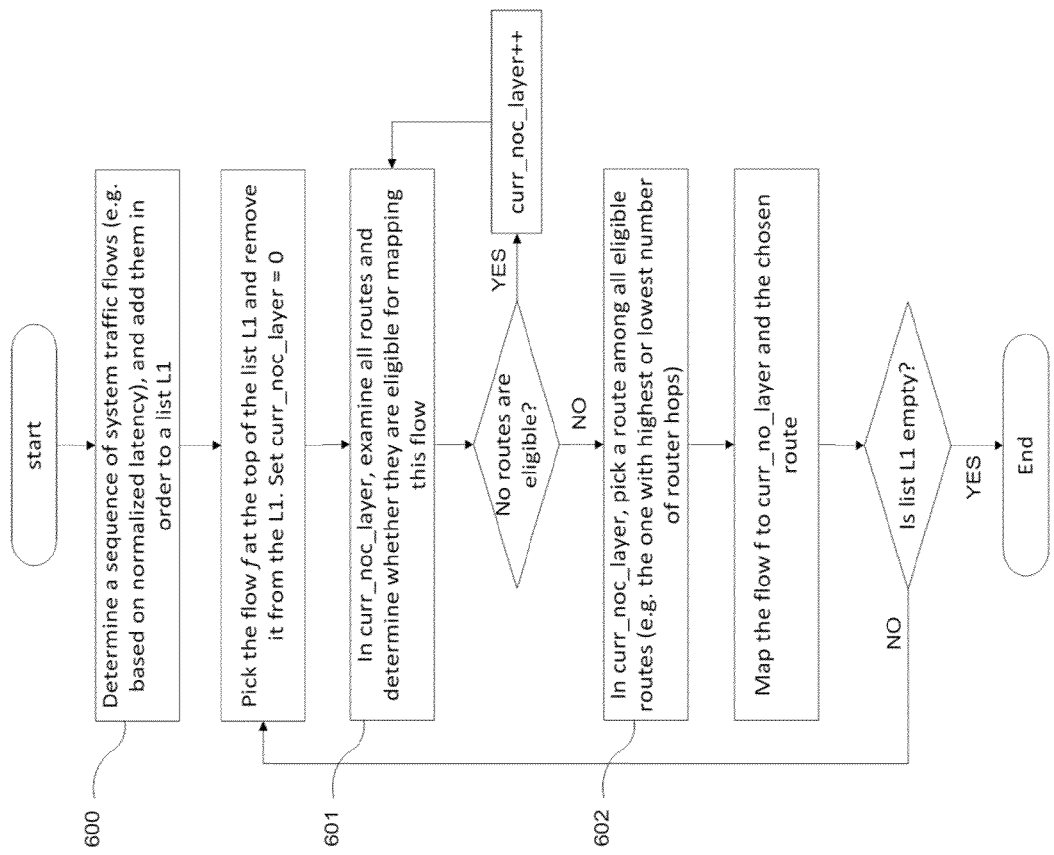
FIG. 6 illustrates a flowchart of an example implementation of automatically determining the topology of the NoC layers and mapping flows to NoC layers that satisfies the flow's latency requirements.

The previous example implementation is summarized formally in FIG. 6. All flows are processed (e.g., in a certain order/sequence) as shown at step 600. Flows with higher normalized latency may be processed before the flows with lower normalized latency. Alternative implementations may process them in the reverse order or in multiple orders and then pick the one that gives the best result for a desired implementation. At 601, all routes in the current NoC layer for the flow are examined and checked whether the route is eligible for mapping the flow. A route is eligible if after mapping the flow along the route and instantiating all the needed routers, no previously mapped flow's latency constraint or the latency constraint of current flow are violated. When a flow is mapped, routers may need to be instantiated at the source and destination nodes and at all nodes where the flow merges with some previously mapped flows coming in or going out (or both) in different direction than the present flow, if there is no existing router to facilitate the present flow. If no routes are eligible, then the next NoC layer is examined for mapping the flow. If eligible routes are present, then one of them is selected in 602. One may select a route with the maximum or minimum number of router hops. Each may give different results in terms of average latency and cost of the NoC in terms of number of routers and links. Subsequently the next flow is mapped. When all flows are mapped, then the algorithm ends.

An alternative example implementation may augment the previous procedure by combine bandwidth analysis and optimization of NoC channels as well as the virtual channel allocation for the flows as they are being mapped. This design will involve: 1) automatically classifying traffic flows into various classes depending on the latency requirements of the flows and the position of source and destinations components of the flows, 2) identifying eligible NoC layer and eligible routes in the layer for the flow; 3) Determining if the layer and the route has available virtual channels for deadlock avoidance and isolation and available bandwidth for this flow and then only considering those routes that have bandwidth and virtual channels available; 4) from among all the routes, load balancing performing load balancing in terms of bandwidth, virtual channel in addition to the number of hops and latency in deciding the route for this flow; and 5) finally mapping the flow to the route in the layer and updating all data-structures to track the bandwidth of various channels and virtual channel dependencies and usage.

The resulting procedure of this similar to the one shown in FIG. 6 except that the eligibility criteria of the routes will be different. A number of alternative implementations may be used such as considering the NoC layers randomly instead of considering them in an increasing order starting at layer 0, or considering mapping the flow at all eligible routes of all NoC layers and then selecting the best route among them. A few examples of related bandwidth aware and virtual channel aware mapping of flows to multiple NoC layers is described in U.S. patent application Ser. No. 13/752,226, herein incorporated by reference in its entirety for all purposes.

To track the virtual channel usage in the NoC as flows are being mapped, a channel dependency graph is constructed and updated every time a flow is mapped to a NoC layer, a route and VCs. The details of the dependency graph construction and deadlock detection and avoidance with additional VCs are described in U.S. application Ser. Nos. 13/599,559 and 13/745,684, herein incorporated by reference in their entirety for all purposes. A check may be performed as well to determine whether there are VCs in the route in the NoC layer that can provide the isolation properties to the flow; only those where such VCs are available are considered for the flow. To facilitate this, the VCs maintain certain properties such as Quality of Service (QoS) class, priority, etc., which can be updated when a flow is mapped. These VC properties may be used to match against the needed properties of a flow to determine whether a VC can be used for a flow or not.

Figure 7:
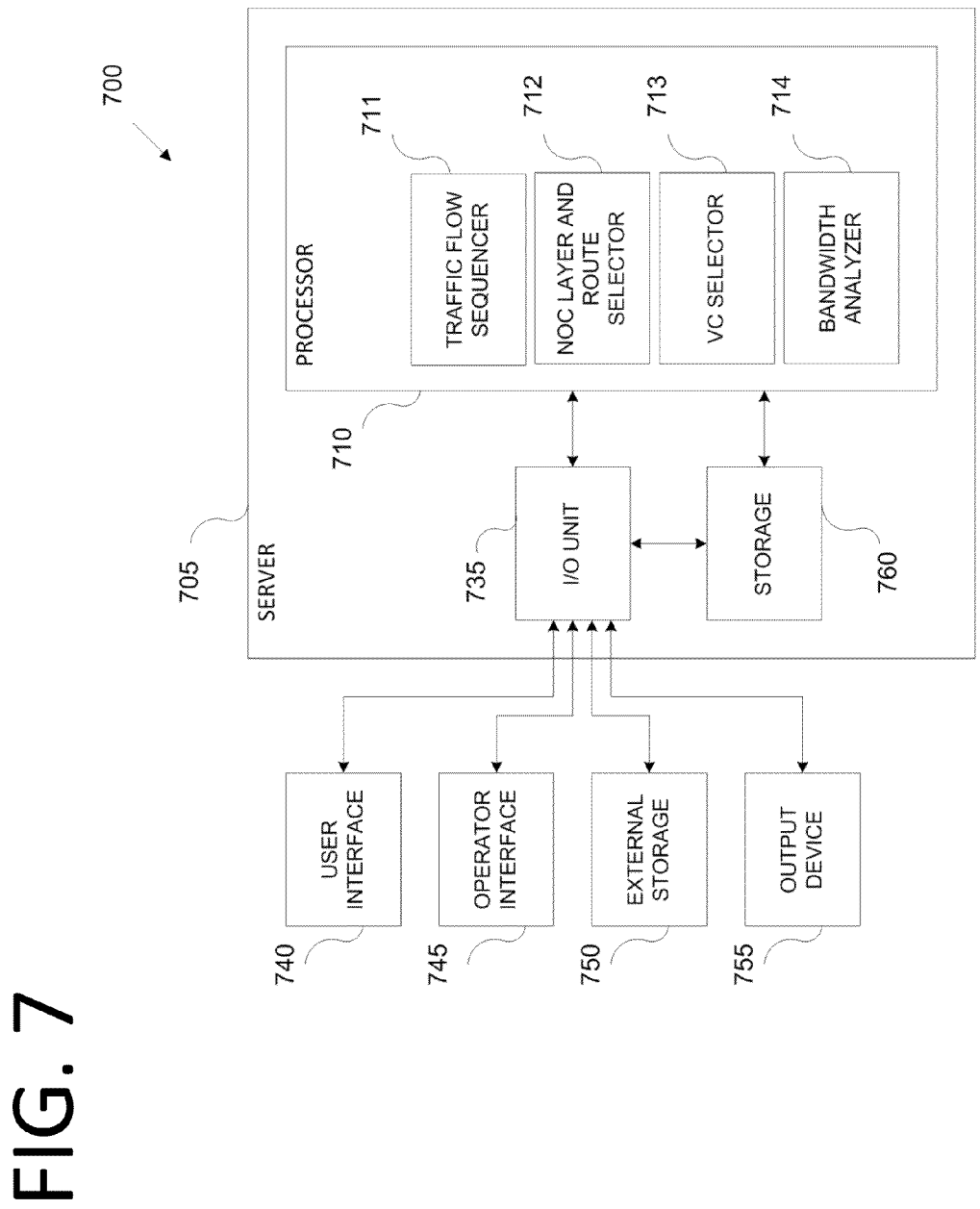
FIG. 7 illustrates a computer/server block diagram upon which the example implementations described herein may be implemented.

FIG. 7 illustrates an example computer system 700 on which example implementations may be implemented. The computer system 700 includes a server 705 which may involve an I/O unit 735, storage 760, and a processor 710 operable to execute one or more units as known to one of skill in the art. The term "computer-readable medium" as used herein refers to any medium that participates in providing instructions to processor 710 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 740 and operator interfaces 745 which may utilize input devices such as a keyboard, mouse, touch device, or verbal command.

The server 705 may also be connected to an external storage 750, which can contain removable storage such as a portable hard drive, optical media (CD or DVD), disk media or any other medium from which a computer can read executable code. The server may also be connected an output device 755, such as a display to output data and other information to a user, as well as request additional information from a user. The connections from the server 705 to the user interface 740, the operator interface 745, the external storage 750, and the output device 755 may via wireless protocols, such as the 802.11 standards, Bluetooth® or cellular protocols, or via physical transmission media, such as cables or fiber optics. The output device 755 may therefore further act as an input device for interacting with a user.

The processor 710 may execute one or more modules. The traffic flow sequencer module 711 may be configured to order the flows based on various properties of the flows and system for processing and to assign the flows to NoC layers and routes, based on a mapping and load balancing configuration. The NoC layer and route selector module 712 may track the properties such as router allocation status in various NoC layers, flows already mapped to the NoC channels and their latency constraints, load on the channels to determine which NoC layers and which routes may be used for any given flow and then select the most suitable route. The VC selector module 713 may be configured to select VCs along a route in a NoC layer which avoids deadlock and maintains the traffic isolation properties. The Bandwidth analyzer module 714 may determine whether the bandwidth available at a route is adequate to satisfy the requirements of the flow; for this it may track the available bandwidth of various channels as flows are being mapped.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
    Constructing by processor circuitry multiple heterogeneous network on chip (NoC) interconnect layers, such that at least a first layer of the NoC interconnect layer has a different topology than a second layer of the NoC interconnect layers,
    wherein the constructing the multiple heterogeneous NoC interconnect layer with different topologies is conducted dynamically, based on at least one of a latency requirement of system traffic flows, a bandwidth requirement, a flow isolation requirement, and one or more of quality of service (QoS) properties of system traffic flows of the NoC.

2. The method of claim 1, wherein the constructing the multiple heterogeneous NoC interconnect layers comprises:
    assigning one or more traffic flows to each of the multiple heterogeneous NoC interconnect layers based on at least one of a latency requirement and a bandwidth requirement of the one or more traffic flows; and
    configuring hardware element placement and topology for each NoC layer based on the assigning of one or more traffic flows.

3. The method of claim 2, wherein the assigning one or more traffic flows comprises:
    determining eligibility of a plurality of routes in one of the multiple heterogeneous NoC interconnect layers for each of the one or more traffic flows based on the latency requirement of said each of the one or more traffic flows;
    selecting one of the eligible plurality of routes for the each one or more traffic flows; and
    updating a topology of the one of the multiple heterogeneous NoC interconnect layers.

4. The method of claim 2, wherein the assigning one or more traffic flows comprises:
    determining a sequence of the one or more traffic flows based on one or more requirements; and
    assigning the one or more traffic flows to the each of the multiple heterogeneous NoC interconnect layers based on the sequence.

5. The method of claim 2, wherein the configuring hardware element placement and topology for each NoC layer based on the assigning of one or more traffic flows further comprises allocating one or more virtual channels to the each NoC layer based on a latency requirement of the one or more traffic flows.

6. A non-transitory computer readable storage medium storing instructions for executing a process, the instructions comprising:
    Constructing by processor circuitry multiple heterogeneous network on chip (NoC) interconnect layers, such that at least a first layer of the NoC interconnect layer has a different topology than a second layer of the NoC interconnect layers,
    wherein the constructing the multiple heterogeneous NoC interconnect layer with different topologies is conducted dynamically, based on at least one of a latency requirement of system traffic flows, a bandwidth requirement, a flow isolation requirement, and one or more of quality of service (QoS) properties of system traffic flows of the NoC.

7. The non-transitory computer readable storage medium of claim 6, wherein the constructing the multiple heterogeneous NoC interconnect layers comprises:
    assigning one or more traffic flows to each of the multiple heterogeneous NoC interconnect layers based on at least one of a latency requirement and a bandwidth requirement of the one or more traffic flows; and
    configuring hardware element placement and topology for each NoC layer based on the assigning of one or more traffic flows.

8. The non-transitory computer readable storage medium of claim 7, wherein the assigning one or more traffic flows comprises:
    determining eligibility of a plurality of routes in one of the multiple heterogeneous NoC interconnect layers for each of the one or more traffic flows based on the latency requirement of said each of the one or more traffic flows;
selecting one of the eligible plurality of routes for the each one or more traffic flows; and
updating a topology of the one of the multiple heterogeneous NoC interconnect layers.

9. The non-transitory computer readable storage medium of claim 7, wherein the assigning one or more traffic flows comprises:
determining a sequence of the one or more traffic flows based on one or more requirements; and
assigning the one or more traffic flows to the each of the multiple heterogeneous NoC interconnect layers based on the sequence.

10. The non-transitory computer readable storage medium of claim 7, wherein the configuring hardware element placement and topology for each NoC layer based on the assigning of one or more traffic flows further comprises allocating one or more virtual channels to the each NoC layer based on a latency requirement of the one or more traffic flows.

11. A system, comprising:
a Network on Chip (NoC) layer and a route selector module configured to construct multiple heterogeneous network on chip (NoC) interconnect layers, such that at least a first layer of the NoC interconnect layer has a different topology than a second layer of the NoC interconnect layers,
wherein the constructing the multiple heterogeneous NoC interconnect layer with different topologies is conducted dynamically, based on at least one of a latency requirement of system traffic flows, a bandwidth requirement, a flow isolation requirement, and one or more of quality of service (QoS) properties of system traffic flows of the NoC.

12. The system of claim 11, wherein the NoC layer and route selector module is further configured to:
assign one or more traffic flows to each of the multiple heterogeneous NoC interconnect layers based on at least one of a latency requirement and a bandwidth requirement of the one or more traffic flows; and
configure hardware element placement and topology for each NoC layer based on the assigning of one or more traffic flows.

13. The system of claim 12, wherein the NoC layer and route selector module is further configured to:
determine eligibility of a plurality of routes in one of the multiple heterogeneous NoC interconnect layers for each of the one or more traffic flows based on the latency requirement of said each of the one or more traffic flows;
select one of the eligible plurality of routes for the each one or more traffic flows; and
update a topology of the one of the multiple heterogeneous NoC interconnect layers.

14. The system of claim 12, further comprising a traffic flow sequencer module configured to determine a sequence of the one or more traffic flows based on one or more requirements; and
Wherein the NoC layer and route selector module is configured to assign the one or more traffic flows to the each of the multiple heterogeneous NoC interconnect layers based on the sequence.

15. The system of claim 12, the NoC layer and route selector module is further configured to allocate one or more virtual channels to at least one of the multiple heterogeneous network on chip (NoC) interconnect layers based on a latency requirement of the one or more traffic flows.

* * * * *